United States Patent [19]

Coppage et al.

[11] 3,865,966

[45] Feb. 11, 1975

[54] EXPANDED PROTEIN LATTICE FOOD PRODUCT AND METHOD OF MAKING

[75] Inventors: Thomas B. Coppage, Richmond Heights; Ronald J. Flier, Ladue; Bernard M. Payne, St. Charles, all of Mo.

[73] Assignee: Ralston Purina Company, St. Louis, Mo.

[22] Filed: July 5, 1973

[21] Appl. No.: 376,857

Related U.S. Application Data

[63] Continuation-in-part of Ser. No. 280,539, Aug. 14, 1972, abandoned, which is a continuation of Ser. No. 5,983, Jan. 26, 1970, abandoned.

[52] U.S. Cl. ............... 426/372, 426/407, 426/802, 426/805
[51] Int. Cl. ............................................. A23j 3/00
[58] Field of Search .......... 426/210, 212, 314, 371, 426/372, 407, 408, 802, 805

[56] References Cited
UNITED STATES PATENTS

| | | | |
|---|---|---|---|
| 1,926,185 | 9/1933 | Vogt | 426/407 |
| 1,964,010 | 4/1928 | Vogt | 426/407 |
| 3,482,996 | 12/1969 | Christianson et al. | 426/56 |
| 3,482,998 | 12/1969 | Carroll et al. | 426/371 |
| 3,535,405 | 12/1950 | Fulton | 426/407 |

*Primary Examiner*—Samih N. Zaharna
*Assistant Examiner*—Ernest G. Therkorn
*Attorney, Agent, or Firm*—Virgil B. Hill

[57] ABSTRACT

A complete maintenance, nutritionally balance animal food composition of a moisture content of about 75 percent is presented which incorporates expanded soybean fiber chunks throughout to simulate natural metal chunks and to resemble a canned all meat product, said chunks having been impregnated with flavorful components to impart a meat-like taste and consistency thereto, and a process for producing said food composition comprising: grinding raw animal meat containing proteinaceous material to particles of a substantially uniform size; mixing expanded soybean fiber chunks, moisture and oils therewith; cooking the slurry of said chunks to impregnate them with flavorful components of said particles of meat, flavors and oils for consistency and taste, the cooking being carried out at a sufficient moisture content to allow the food composition to resemble a canned, all meat food product; then forming a nutritionally balanced food composition with the cooked slurry; packing the food composition into a container; and cooking under pressure to sterilize the food composition.

10 Claims, No Drawings

EXPANDED PROTEIN LATTICE FOOD PRODUCT AND METHOD OF MAKING

This application is a continuation-in-part of our previously filed application Ser. No. 280,539 filed Aug. 14, 1972, which is a continuation of our prior application Ser. No. 5,983 filed on Jan. 26, 1970 now both abandoned.

BACKGROUND OF THE INVENTION

This invention relates to a food product which incorporates simulated meat"chunks" produced from vegetable proteins as well as a method of producing such a food product.

Recently, much effort has been directed towards the development of meat-like or meat simulating food materials from various available vegetable protein sources such as the oilseeds, to include soybeans, cottonseeds, or peanuts. A great deal of effort has been directed towards a cheap economical method of producing expanded simulated meat products from vegetable proteins by extrusion or other cooking techniques such as described in U.S. Pat. No. 3,496,858 and which resembles a chunk of meat in appearance, physical structure, texture and mastication properties. Among the characteristics sought in such a meat chunk substitute is its ability to serve as a partial or complete replacement for the more expensive natural meat chuncks in a food product at a level which would reduce the overall ingredient cost of the particular food product. "Chunk style" meat food products are highly desirable in either a human or animal food both from the standpoint of aesthetic quality and consumer appeal as well as mastication properties of the food product in general. Because of this desirability and the high ingredient cost of natural meat chunks, there is a great need for replacement of these more expensive natural meat chunks in a food product with a readily available and economical chunky meat-like vegetable protein product without a corresponding loss in aesthetic appeal, taste or mastication properties of the food product. Such a replacement for natural meat chunks must also have the ability to retain its integrity and shape when subjected to a commercial sterilization and canning process such as that required for production of a high moisture canned food product.

Animal foods in particular have been in need of a chunky meat-like ingredient of a lower cost to replace the expensive natural meat chunks in canned foods of high moisture content. For example, a gourmet type canned dog food which contains only meat is highly palatable to the dogs, although it lacks nutritional balance and is correspondingly more expensive than a cereal type dry dog food. Although combinations of cereal and meat components have been developed for the purpose of serving as an intermediately or low priced, complete maintenance, totally nutritious animal food, they have lacked some of the desirable properties and palatability of all meat products, to include the chunky characteristics of natural meat which is used in all meat products, since to employ the more expensive natural meat chunks would make the ingredient cost high and in turn reduce consumer acceptance of the food product. Because of this, the development of a cheap, economical method of producing simulated meat chunks from vegetable proteins has filled a real need in the food industry and, furthermore, provided a means for replacing the chunk meat materials desired in various food products, while substantially reducing the ingredient cost and making such a product highly marketable without losing any of the appearance, texture, feel or mastication properties characteristic of natural meat chunks.

Since an extruded or expanded simulated meat product has a fibrous lattice structure closely resembling the fibrous structure of natural meat, it furthermore has the ability to absorb natural juices or flavors of natural meat products within this fibrous lattice structure and thus to feel, look, taste and appear in quality and texture to be a chunk of natural meat. Because of the lattice characteristic of this expanded or extruded simulated meat product, we have found it possible to produce novel canned animal food products containing an expanded or extruded simulated meat product in chunk form and in a gravy or sauce, which closely resembles a canned animal food meat product with the natural meat in chunky form, since it is able to absorb any flavor components or juices of natural meat and to impart flavor, softness, texture and smoothness to the expanded simulated meat chunk in such a manner that it resembles in taste, appearance and mastication properties, a real chunk of meat.

SUMMARY OF THE INVENTION

Therefore, among the several objects of the present invention may be noted the provision of a canned, meaty chunk type animal food of a high moisture content which contains simulated meat chunks produced from vegetable protein as a replacement for the more expensive natural meat chunks and which in turn resembles a natural meat chunk product in appearance, flavor, taste, and mastication properties. The provision may also be noted that the canned meat chunk animal food of the present invention provides an economical and completely nutritious total maintenance diet for the animal, which is substantially as palatable as an all meat canned product and, furthermore, has the delicious aroma and aesthetic appeal in general of a more expensive food product. A further object of the present invention is to provide a method for preparing a nutritionally balanced animal food product which incorporates a fibrous, expanded, textured vegetable protein substitute for natural meat chunks and the provisions of this method for simulating the appearance and palatability of an all meat canned type product which is both economical and reliable to practice on a commercial scale.

The canned animal food product in the present invention employs in place of natural meat chunks expanded simulated meat chunks derived from vegetable proteins such as soybeans and which are produced by extrusion or other cooking techniques of soybean meal, concentrates, or isolates. These simulated meat chunks are of expanded fibrous structure, with the fibers forming a meat-like lattice which closely resembles natural meat in texture and appearance. These expanded, simulated meat chunks are so similar to the natural meat chunks that they may be appropriately colored and flavored to taste and appear the same as natural meat chunks. One of their unique features is their ability to readily absorb moisture, oils or flavors and thus, when incorporated with economical natural meat by-products, absorb the juices and flavoring of the natural meat products, thus in turn providing a cheap meat tasting chunk of meat-like mastication properties which is of a substantially lower cost than a natural meat chunk.

The present invention is also directed toward a process for preparing an economical meat type food product of a high moisture content utilizing expanded soybean fiber meat chunks and which has the same product identity and characteristics of an all meat food product, comprising grinding meat to a substantially uniform size, adding expanded soybean fiber chunks, moisture, oils, and flavors; cooking the fibers chunks in the juices of the natural meat, moisture, oils, and flavors to allow their absorption and thus impregnation with flavor components; adding nutritious materials to effect complete nutritional balance as well as flavoring, coloring or other components to improve product characteristics; adding to a container; then sealing the container and heating to cook and commercially sterilize the total product.

DESCRIPTION OF THE PREFERRED EMBODIMENTS

In preparing an animal food product in accordance with the method of the present invention, natural meats such as poultry, fish or animal meats and meat by-products having the requisite quality, ingredient cost and palatability are first selected and formulated. Depending on the flavor or palatability to be imparted to the food product, the meat or meat by-products may be selected from a wide range of components to permit the processor a wide range of flexibility in selecting the natural meat components to be used in the present product. Based upon testing from the standpoint of processing, palatability and also imparting the desired flavor to the animal food product, we have found the following types of meat may be utilized within the ranges stated, to impart a beef, chicken, fish, liver, shrimp or other type of flavor to the food product. The ranges stated relate to the percentage of meat in the final product and are set forth as illustrative ranges of meat rather than limiting ranges. Obviously, high percentages of meats may be employed depending on the palatability of the product, flavor, cost or appearance and the following ranges are not intended to be limiting. In general, the percentage of meat which may be employed can be from the lowest percentage listed, i.e., 9 percent to about 70 percent by weight of the product, with a preferred amount being about 19 to 70 percent by weight of the product.

| Beef Flavor | |
|---|---|
| Meat Type | Percentage by Weight |
| Beef Gullets | 9 – 14% |
| Beef Cheek Trims | 9 – 11% |
| Beef Heart Caps | 9 – 14% |
| Carcass Beef | 9 – 14% |
| Whole Ground Chicken | 0 – 11% |
| Liver Flavor | |
| Meat Type | Percentage by Weight |
| Pork Liver | 10 – 13% |
| Beef Liver | 10 – 13% |
| Whole Ground Chicken | 9 – 12% |
| Hash Flavor | |
| Meat Type | Percentage by Weight |
| Whole Ground Chicken | 9 – 11% |
| Beef Gullet | 9 – 14% |
| Beef Heart Caps | 9 – 14% |
| Carcass Beef | 9 – 14% |
| Beef Cheek | 9 – 11% |

-Continued

| Chicken Flavor | |
|---|---|
| Meat Type | Percentage by Weight |
| Whole Ground Chicken | 20 – 25% |
| Liver Chicken Flavor | |
| Meat Type | Percentage by Weight |
| Whole Ground Chicken | 9 – 12% |
| Pork liver | 10 – 11% |
| Beef Liver | 10 – 11% |
| Liver Fish Flavor | |
| Meat Type | Percentage by Weight |
| Pork Liver | 12 – 15% |
| Beef Liver | 12 – 15% |
| Mackerel | 10 – 11% |
| Preground Ocean Fish | 10 – 11% |
| Mackerel or Fish Flavor | |
| Meat Type | Percentage by Weight |
| Mackerel | 10 – 25% |
| Preground Ocean Fish | 10 – 25% |
| Tuna Red Meat | 0 – 15% |
| Tuna Head Meat | 0 – 10% |
| Shrimp Flavor | |
| Meat Type | Percentage by Weight |
| Deshelled Shrimp | 15 –25% |
| Mackerel | 0 – 10% |
| Preground Ocean Fish | 0 – 10% |

It will be understood that other meats containing proteinaceous material and suitable for animal consumption may be used in the practice of the present invention, depending on the flavor and palatability it would impart to the final food product.

The meat types which are selected and formulated to provide flavor for the present food product are, according to the method of the present invention, maintained in either a chilled or frozen condition which may be from a temperature ranging from −20°F to 40° F. The meat selected for use is then passed through a meat grinder equipped with a ⅜ inch grinding plate to reduce the meat into pieces of a substantially uniform size. The size of ⅜ inch for the ground meat is preferred for most of the animal foods produced in accordance with the method of the present invention, but it will be understood that satisfactory results may be obtained by grinding the meat to a particle size ranging from ⅛ inch to 1 inch, depending on the type of product preferred. For example, in the hash type food product or in a cat food a smaller particle size of natural meat is preferred over other products such as dog foods. If meats which are frozen are used in the method of the present invention, they first must be prebroken or cut into squares or pieces in order to reduce the size of the chunks going into the meat grinder. The size that is required will in turn depend on the size of the meat grinder intake, but normally will be 4 inches × 4 inches or larger in size. Appearance of the final product may be varied between a hash type food product and a chunk style food product, depending on the particle size to which the meat is ground. The meat should be ground to a substantially uniform size, since the product's appearance and aesthetic appeal is improved by this characteristic.

The ground meat of a substantially uniform size can thereafter be mixed with the expanded soybean fiber chunks which serve as the main and larger chewy, meaty chunks in the food product of the present invention. The meat can either be precooked at about 160° to 175°F followed by the addition of fiber chunks, moisture and oils followed by cooking of the mixture or alternatively the fiber chunks can be preheated themselves at 160° to 175°F with the necessary moisture and dry ingredients followed by the addition of the raw meat and resultant cooking of the fiber mixture at 160° to 185° F. This alternative procedure has the advantage of avoiding the need for precooking of the meat. The expanded soybean fiber chunks may be added to the final animal food product in any amount up to about 25 percent by weight of the final product, and still retain the product characteristics. The balance of natural meat proteinaceous materials and expanded soybean fibers proteinaceous materials will, of course, vary depending on the quality of the natural meat materials, the nutritional balance to be achieved, as well as palatability of the product, although the amount of natural meat or meat byproducts can be used in any amount, depending on the protein level, nutritional balance of the final food product, or characteristics. The amount used will preferably range between 19 – 70 percent by weight of the final product in order to produce a product within the general protein range indicated and the expanded fiber chunks will be added in any amount up to about 25 percent by weight of the final product, again depending on the protein content desired. A preferred range of addition for the fiber chunks is between about 8 – 10 percent by weight of the product. Generally, the animal food composition produced by the method of the present invention, since it is intended to be a nutritionally balanced, complete maintenance and economical diet for the animal, will normally have a protein content within the general range of 9 – 20 percent, although the preferred range is between 13 and 16 percent protein in the final product, which has a moisture content of approximately 72 – 75 percent. The animal food composition will also have a fat content which may vary within the general range of 2 – 9 percent but more consistently with the range of 3 – 8 percent. With the requirement of between 13 – 16 percent protein and 3 – 8 percent fat, a balance of natural meat materials as well as expanded soybean fiber chunks will be achieved to provide a protein and fat content within the ranges stated. It is, of course, understood that some of the nutritious materials which are added at a later step of the process may supply some of the protein or fat requirement of the animal food composition of the present invention. The expanded soybean fiber chunks employed in the method of the present invention may be formed by extrusion or other cooking techniques to in turn create an expanded meat-like lattice of a high water absorption capacity with the ability to maintain its integrity or shape when subjected to cooking conditions such as that involved with commercial canning or sterilization. The size of the expanded soybean fiber chunks used in the present invention will, of course, vary depending on the type of food product to be simulated but will generally be of essentially a uniform size with a somewhat irregular, rough or jagged surface to simulate a roughly cut natural chunk of meat on rehydration, although chunks with a smooth cut can be used. The expanded soybean fiber chunks as employed presently in, for example, a cat food will normally be of a size sufficient for all of the chunks used to pass a ½ inch screen with about 70 percent of the chunks being retained on a ⅜ inch screen, and about 100 percent of the chunks being retained on a ⅛ inch screen. In a dog food the size of the fiber chunks will be sufficient for all of the chunks used to pass a ⅝ inch screen, with about 70 percent of the chunks being retained on a ⅜ inch screen and about 100 percent of the chunks being retained on a ¼ inch screen. The expanded soybean fiber chunks preferably have been dried to a moisture content of between 7 – 12 percent, although chunks of a higher moisture content could be utilized. The expanded fiber chunks when dried rapidly rehydrate when used in the method of the present invention and attain a soft meat-like texture. A suitable means of making an expanded fiber which may be used in the present invention, although the present invention is not limited to a technique of producing an expanded fiber, is that described in U.S. Pat. No. 3,496,858. Other types of expanded fibers which are suitable in the instant invention — and it is intended to include these within the scope of the term "expanded fiber" in the instant invention — are expanded fibrous products which are derived from a mixture of a meat source and a vegetable protein source. Techniques for the production of a fiber of this type are described in U.S. application Ser. No. 193,709 filed Oct. 29, 1971. The expanded fibers have the unique feature of having a high water absorption capacity and thus are readily rehydratable and in the present invention are added to the meat or meat by-products along with fats or oils, either animal or vegetable, such as tallow or corn oil, flavoring agents such as dried meat solubles or equivalent dried meat products, Stange's meat seasoning produced by Stange Company, Peller liver flavor produced by Universal Oil Products Company, garlic flavoring, fennel seeds or Marjoram, as well as Bay and Rosemary leaves, and 50 to 96 percent of the final moisture content of the product and in turn cooked in these juices, flavors, oils and with the natural meats to absorb much of the flavor components of the meat products as well as any added flavoring to thus impart a desirable taste and consistency to the fiber chunk. Alternatively, the expanded fibers may first be exposed to the necessary moisture, flavoring and dry ingredients prior to the addition of meat and hydrated with these ingredients by heating to a temperature of between about 160° to 175°F. The heated fiber mixture may thereafter be maintained at this temperature at which time the precooked meat or raw meat may be added for the final cooking step. In the event raw rather than precooked meat is used at this stage of the process, this eliminates the need for a precooking step. We have determined that it is necessary to add approximately 50 – 94 percent of the moisture of the final product at this stage of the process depending on the level of meat, since about this much is required for consistent reproduction of the final product's characteristics which allow the product to resemble a canned meat product. These characteristics which are dependent on the addition of most of the product's moisture at this stage are the product's ability to remain in an unsegregable mass in somewhat the shape of the can when poured from it and yet to readily be pulled apart with a fork or utensil in a manner resembling canned chunks of meat cooked in their natural juices. The flavoring described may be added to the natural meat cooking broth or juice for the expanded soy fiber chunks to impart flavor to the product and improve its palatability, or may be added after the cooking step with the nutritious materials. The expanded soybean fiber also has the ability upon absorption of liquids to acquire a soft, chewy texture to its meat-like lattice, resembling closely the mastication properties of natural meat. The addition of most of the final product's moisture at this stage imparts a low enough viscosity to the broth or flavor components, the natural meat juices and the oils or fats to be readily absorbed by the expanded soybean fiber chunk. This in turn allows a homogenous product to be formed with all of the soybean fiber chunks having identical consistency, and when the final product is later poured from a can by the consumer, it appears of a homogenous and uniform quality without segregation of any dried or apparently uncooked soybean fiber chunks. Cooking of the expanded fiber chunks in about 50 – 94 percent of the final product's moisture, the meat, flavors and oils or fats, not only allow easy absorption of flavor components and moisture by the expanded chunks to impart flavor and consistency to them, but also serves the purpose of coagulating the natural meat protein pieces into small discrete particles upon cooking and in turn causing these to adhere to the large chunks of expanded soybean fibers as they absorb the juices and flavors. This adherence effect due to the water absorption capacity of the soybean fiber chunks, later allows the final product to be thickened during retorting by gelatinization of starch bearing nutritious materials which are used for nutritional balance and to form a homogenous mixture which retains somewhat the shape of the container when poured from it, although the mass of meat appearing chunks may be readily shredded or pulled apart with a fork or other utensil. If the amount of moisture is too low, coagulation of the meat protein and the later thickening by gelatinization may be to such a degree that when the product is poured from the can it appears as a cylinder with an undesirable thick and mud-like consistency. On the other hand, if the moisture is too high, only a soft, mushy consistency results which will not retain the shape of the can when poured therefrom and no longer resembles a canned meat animal food. The temperature for cooking of the expanded soybean fiber chunks in the juices of the natural meat or in the flavorful broth of oils and flavors may be conveniently carried out within the range of 130°F. to 190°F. preferably at 160°F. to 175°F., by injection of live steam at 10 to 15 psi into the unit where cooking of the fibers with the natural meat is done. Mixing is also carried out during the cooking step to insure uniform impregnation of the fiber lattice. The use of steam also forms enough condensate to provide an additional 6 percent or so moisture of the final moisture of the product.

The fibers which are added to the product at this stage may also be appropriately colored by the addition of dyes or coloring agents during the expansion process so that they may have a rare or well done appearance when the product is opened. Thus, the color may be varied between a reddish or reddish brown by using any dye suitable for food use such as FD&C Red No. 3, yellow No. 5 or yellow No. 6 during the expansion process. Preferably, an iron oxide or other water insoluble dye is used for this purpose, since it doesn't later leach out of the fiber chunk by contact with water. A yellow dye is highly desirable to impart color to the expanded fiber chunk when used in a chicken or fish flavored product and may be conveniently used for this purpose. By varying the amount and type of the reddish dyes used, the fibers may also be made to resemble rare or well done chunks of meat.

The fibers should be cooked in the flavorful broth or natural meat juices, flavors and oils with mixing for a period of time required to bring the mixture up to the operating temperature range of 160° F. to 175° F., which time is also sufficient to coagulate the natural meat protein particles and cause their adherence to the expanded soybean fiber chunks as the chunks absorb the flavors and juices.

The slurry of the expanded soybean fibes, natural meat products and flavorful broth are then maintained between the temperature range of 160° F. to 185° F., preferably at 165° F. At this point in the process nutritious materials, to include vitamins, minerals, carbohydrates or farinaceous materials, are added to the slurry of soybean fiber chunks in the flavorful broth to give complete nutritional balance to the final product, although the nutritious materials can be blended with the moisture used during the fiber cooking step to form a homogenized or blended gravy for the cooking step as well as provide nutritional balance. The process is generally simpler, however, if the materials are added at this step. The addition of nutritious materials also serves to somewhat thicken the slurry of the fiber chunks and natural meat. The purpose of a high preheat temperature at this stage is to not only aid in forming a homogenous product but to reduce time in the later steps of canning and retorting. Lower temperatures during the preheat stage could require steam injection within the can for vacuum canning and this would in turn require correspondingly longer retort cook cycles.

Typical materials which comprise the nutritious materials added to the flavorful broth of soybean fiber chunks and the amount by weight of the final product at which they are formulated are listed below, although the exact material and amount depends on the nutritional balance to be achieved.

| Material | Percentage by Weight |
| --- | --- |
| Vitamin Premix | 1.0% |
| Dried Egg | 0 – .1% |
| Dried Meat Solubles | 0 – 3% |
| Dried Blood | 0 – .6% |
| Poultry Meal | 0 – 7.0% |
| Barley | 0 – 3.0% |
| Ground Oats | 0 – 5% |
| Animal Fat | 0 – 12% |
| Corn Oil | 0 – .1% |
| Soy Flour | 0 – 5% |
| Wheat Flour | 0 – 1% |
| Meat Meal | 0 – 6% |
| Hydrolyzed Vegetable Protein | 0 – .5% |
| Mineral Premix | .5% |
| Sodium Nitrite | 0 – .015% |
| Coloring Agents: | |
| Caramel | 0 – 1.25% |
| Titanium Dioxide | 0 – .3% |
| FD&C Yellow 5 | 0 – .003% |
| FD&C Yellow 6 | 0 – .003% |
| FD&C Red 3 | 0 – .005% |
| Iron Oxide | 0 – .05% |
| Salt | 0 – .25% |
| Flavoring Agents: | |
| Garlic | 0 – 0.5% |
| Stenge's Meat Seasoning | 0 – 1.25% |
| Peller Liver Flavor | 0 – 1.25% |
| Bay and Rosemary Leaves | 0 – 0.5% |
| Fennel Seeds | 0 – 0.5% |
| Marjoram | 0 – 0.5% |

This slurry of the soybean fiber chunks impregnated with the flavor and juices of the natural meat broth and the nutritious materials is then fed into a packing station for packing into cans or other containers. The cans are packed and sealed in a conventional manner and employing conventional sealing procedures. Normally, the cans at this stage are maintained at a temperature of between 150° F. and 170° F. and are carried to the retort or cooking stage as quickly as possible to prevent there being any risk of microbiological spoilage during the time between canning and sterilization during the retort or cooking stage. Normally, this time will not exceed 45 minutes.

The canned slurries of impregnated expanded soy fiber chunks are then subjected to heating or retorting in order to cook and effect commercial sterilization of the product. Conventional retorting procedures may be employed for heating the cans, and this will vary somewhat, depending upon the preheating temperature and time required to fill the retort cookers. Retorting temperature will typically range between 245° to 250° F. at 15 psi for approximately 65 minutes for good results, although it will be understood that higher or lower temperatures may be used to achieve retorting in shorter or longer periods of time. Generally the temperature would not exceed 275° F., since this would tend to burn the product. Upon completion of the proper heating cycle during the retorting operation, the cans are cooled, rinsed and allowed to dry. This will generally require a period of time ranging from 20 to 30 minutes with cool water which is at a temperature between 50° F. and 70° F.

The food product produced by the method of the present invention consists of distinct, unitary, meat-like chunks disposed throughout the food product and which have been impregnated with the flavor components of natural meat and the oils and juices of natural meat to resemble real meat chunks in chewyness, texture and flavor. The food product has a high moisture content comparable to the moisture range normally found in canned meat animal food products, which can range between 68 and 78 percent. Normally, the moisture content will be within a much smaller range of 72 to 75 percent with a protein content between 13 and 16 percent and a fat content between 3 and 8 percent, depending on the flavor of the product produced and the type of natural meat used therewith. The food product has the ability when poured from the can to retain generally the shape of the container or can in a substantially unsegregated mass and when pulled apart with a fork, pulls apart in a similar manner as canned natural meat and appears to be somewhat homogenous in character with the impregnated, soybean fiber chunks appearing as larger meaty chunks in the mixture, which may also be shredded or torn apart with a fork in a manner similar to the shredding or tearing of a natural chunk of meat.

The food product containing the impregnated expanded soybean fiber chunks resembles very closely a canned meat food product of a very high quality. Because of this close resemblance in appearance and texture to an all meat product, and also because of its economical nature and complete nutritional balance, it is substantially as palatable as an all meat product and yet can serve as an economical total maintenance diet for an animal, thus overcoming one of the disadvantages of an all meat pet food product, which is the mixing of dry farinaceous or proteinaceous materials, minerals or vitamins with it for complete nutritional balance in order to serve as the sole maintenance diet for the animal.

The appearance of the expanded soy fiber meat-like chunks may range from a "well done" to a rare appearance, depending on the dye used in the beef product. The addition of yellow dye to the expanded soy fiber chunks may be made to resemble pieces of chicken or fish, depending on the flavor to be imparted to the food product.

The addition of various spices and flavorings such as the garlic or bay leaves serves not only to enhance palatability but also to improve the odor and aesthetic consumer appeal of the final product, since, with proper balance of flavors, a delicious smelling beef hash or beef cooked in burgundy aroma may be simulated.

If desired, other food products may be made according to the method of the present invention by adding scrambled eggs, noodles or other food substances such as vegetables as, for example, peas, carrots, potatoes, etc., to a beef, chicken, liver or hash product prepared by the process described.

The following examples illustrate the present invention as described.

EXAMPLE 1

A dog food of a liver type flavor was prepared by meat being conveyed to a meat grinder equipped with a ⅜ inch grinding plate. The proportions of meat types for the liver flavor were as follows:

| Meat Type | Percentage by Weight |
|---|---|
| Whole Ground Chicken | 9.5% |
| Pork Liver | 10.0% |

After grinding, the meats were conveyed to a preheating unit to which was added the following ingredients in the proportions indicated:

| Ingredient | Percentage by Weight |
|---|---|
| Expanded Soybean Fibers | 8.5% |
| Corn Oil | 0.1% |
| Water | 53.61% |

Live steam is introduced into this mixture so as to bring the mixture to a temperature of about 170° F. to somewhat coagulate the meat protein and cause adherence to the surface of the fiber chunks. Dry ingredients comprising the following materials and in the proportions indicated are then added:

| Ingredient | Percentage by Weight |
|---|---|
| Minerals | .50% |
| Vitamin Premix | 1.0% |
| Dried Meat Solubles | 2.25% |
| Dried Eggs | .100% |
| Ground Oats | 3.0% |
| Meat Meal | 5.0% |
| Caramel Coloring | 1.0% |
| Garlic Flavor | .015% |

The mixture at this point is then maintained within a temperature range of 160° to 185° F. and is then conveyed to the can filling equipment at which point the cans containing the mixture are filled and sealed.

The cans were then placed in bins or baskets which were lowered into vertical retorts operating at a temperature of approximately 245° to 250° F. The cans were then heated at this temperature for about 65 minutes. The cans were then cooled, rinsed and allowed to dry.

The resulting product on inspection was a homogenous mixture with a uniform appearance which when poured from the can retained somewhat the shape of the can, although it could readily be pulled apart with a fork to provide discrete chunks. The mixture had a liver aroma and flavor with distinct meaty chunks visible in the product, of a substantially uniform and flavorful appearance, and with no appreciable shrinkage occurring to the chunks after the heating process. There is likewise no visible separation of the fats or other ingredients and the product resembles closely a can of liver flavored meat and had the following analysis:

| | |
|---|---|
| Protein | 13.8% |
| Moisture | 72.5% |
| Fat | 2.63% |

EXAMPLE 2

A dog food of a beef type flavor was prepared by meat being conveyed to a meat grinder equipped with a ⅜ inch grinding plate. The proportions of meat types for the beef flavor were as follows:

| Meat Type | Percentage by Weight |
|---|---|
| Beef Gullet | 10.0% |
| Beef Cheek Trims | 9.0% |

After grinding, the meats were conveyed to a preheating unit to which was added the following ingredients in the proportions indicated:

| Ingredient | Percentage by Weight |
|---|---|
| Expanded Soybean Fibers | 8.5% |
| Corn Oil | .1% |
| Water | 55.58% |

Live steam is introduced into this mixture so as to bring the mixture to a temperature of about 170° F. to somewhat coagulate the meat protein to form discrete particles thereof and cause their adherence to the surface of the fiber chunks. Dry ingredients comprising the following materials and in the proportions indicated are then added:

| Ingredient | Percentage by Weight |
|---|---|
| Minerals | .5% |
| Dried Blood | .6% |
| Dried Meat Solubles | 3.5% |
| Dried Egg | .1% |
| Sodium Nitrite | .002% |
| Ground Oats | 3.0% |
| Meat Meal | 4.650% |
| Garlic Flavoring | .015% |
| FD&C Red No. 3 | .003% |

The mixture at this point is then maintained within the temperature range of 160° to 185° F. and is then conveyed to the can filling equipment at which point the cans are filled and sealed with the mixture.

The cans were then placed in bins or baskets which were lowered into vertical retorts operating at a temperature of approximately 245° to 250° F.

The cans were then heated at this temperature for about 65 minutes. The cans were then cooled, rinsed and allowed to dry.

The resulting product on inspection was a homogenous mixture with a uniform appearance, which when poured from the can retained generally the shape of the can, although it could readily be pulled apart with a fork to provide discrete chunks. The mixture had a hearty beef aroma and flavor, resembling shredded chunks of a beef roast, with distinct, rare appearing meaty chunks visible in the product, of a substantially uniform and flavorful appearance and with no appreciable shrinkage occurring to the chunks after the heating process. There is likewise no visible separation of the fats or other ingredients and the product resembles closely a can of beef flavored meat and had the following analysis:

| | |
|---|---|
| Moisture | 72.5% |
| Protein | 13.8% |
| Fat | 2.63% |

EXAMPLE 3

A dog food resembling a beef hash of a beef flavor was prepared by conveying to a meat grinder equipped with a ¼ inch grinding plate. The proportions of meat type for the hash type product with a beef flavor were as follows:

| Meat Type | Percentage by Weight |
|---|---|
| Whole Ground Chicken | 9.0% |
| Beef Gullet | 10.0% |

After grinding, the meats were conveyed to a preheating unit to which was added the following ingredients in the proportions indicated:

| Ingredient | Percentage by Weight |
|---|---|
| Expanded Soybean Fibers | 8.5% |
| Corn Oil | .1% |
| Water | 54.22% |

Live steam is introduced into this mixture so as to bring the mixture to a temperature of about 170° F. to somewhat coagulate the meat protein and form discrete particles thereof and cause their adherence to the surface of the fiber chunks. Dry ingredients comprising the following materials and in the proportions indicated are then added:

| Ingredient | Percentage by Weight |
|---|---|
| Minerals | .5% |
| Vitamin Premix | 1.0% |
| Dried Blood | .6% |
| Dried Meat Solubles | 3.5% |
| Dried Egg | .1% |
| Sodium Nitrite | .002% |
| Ground Oats | 1.0% |
| Meat Meal | 5.0% |
| Pearl Barley | 3.0% |
| Garlic Flavoring | .015% |

The mixture at this point is then maintained within the temperature range of 160° to 185° F. and is then conveyed to the can filling equipment at which point the cans containing the mixture are filled and sealed.

The cans were then placed in bins or baskets which were lowered into vertical retorts operating at a temperature of approximately 245° to 250° F. The cans were then heated at this temperature for about 65 minutes. The cans were then cooled, rinsed and allowed to dry.

The resulting product on inspection was a mixture resembling closely a beef hash, with the pearl barley which has been added, appearing as small chunks of potatoes. The mixture when poured from the can retained generally the shape of the can, although it could readily be pulled apart when a fork was applied to it. The mixture had a delicious beef aroma and flavor with the meat chunks resembling that of a shredded beef roast and of a substantially uniform appearance. There was no visible separation of the fats or other ingredients and the product resembled closely a can of beef hash with small pieces of potatoes intermixed with it and had the following analysis:

| | |
|---|---|
| Moisture | 68.3% |
| Protein | 14.6% |
| Fat | 5.08% |

EXAMPLE 4

A dog food of a chicken type flavor was prepared by whole chicken being conveyed to a meat grinder equipped with a ⅜ inch grinding plate. The meat was then gound to a substantially uniform size. The proportion of whole ground chicken meat employed was 25 percent by weight of the final product.

After grinding, the meat was conveyed to a preheating unit to which was added the following ingredients in the proportions indicated:

| Ingredient | Percentage by Weight |
|---|---|
| Expanded Soybean Fibers | 8.5% |
| Corn Oil | .1% |
| Water | 52.365% |

Live steam is introduced into this mixture so as to bring the mixture to a temperature of about 170° F. to somewhat coagulate the meat protein and form discrete particles thereof causing their adherence to the surface of the fiber chunks. Dry ingredients comprising the following materials and in the proportions indicated are then added:

| Ingredient | Percentage by Weight |
|---|---|
| Minerals | .5% |
| Vitamin Premix | 1.0% |
| Dried Meat Solubles | 2.5% |
| Dried Egg | .1% |
| Sodium Nitrite | .001% |
| Ground Oats | 2.0% |
| Meat Meal | 6.0% |
| FD&C No. 3 Color | .0003% |
| FD&C No. 5 Color | .003% |
| FD&C No. 6 Color | .003% |
| Garlic Flavoring | .015% |

The mixture at this point is then maintained within the temperature range of 160° to 185° F. and is then conveyed to the can filling equipment at which point the cans containing the mixture are filled and sealed.

The cans were then placed in bins or baskets which were lowered into vertical retorts operating at a temperature of approximately 245° to 250° F. The cans were then heated at this temperature for about 65 minutes. The cans were then cooled, rinsed and allowed to dry.

The resulting product was inspected and was a homogenous mixture resembling distinct unitary chunks of chicken flesh with a clean chicken odor and a rich yellow color. The product retained generally the shape of the can when poured from it, although the product could readily be pulled apart when a fork was applied to it. There was not visible separation of any of the ingredients and it resembled closely a can of chicken meat. The product furthermore had the following analysis:

| | |
|---|---|
| Moisture | 71.6% |
| Protein | 14.7% |
| Fat | 4.30% |

EXAMPLE 5

A cat food of a generally fish or shrimp type flavor was prepared by the meat first being ground in a meat grinder equipped with a ⅜ inch grinding plate. The meat which was employed was mackerel or shrimp and was used in an amount necessary to yield 25 percent by weight of the final product.

After grinding, the meat was conveyed to a preheating unit to which was added the following ingredients in the proportions indicated:

| Ingredient | Percentage by Weight |
|---|---|
| Expanded Soybean Fibers | 8.5% |
| Corn Oil | .1% |
| Water | 52.639% |

Live steam is introduced into this mixture so as to bring the mixture to a temperature of about 170° F. to somewhat coagulate the meat protein and form discrete particles thereof and cause their adherence to the surface of the fiber chunks. Dry ingredients comprising the following materials and in the proportions indicated are then added:

| Ingredient | Percentage by Weight |
|---|---|
| Minerals | .5% |
| Vitamin Premix | 1.0% |
| Poultry Meal | 7.0% |
| Sodium Nitrite | .001% |
| Ground Oats | 2.0% |

The mixture at this point is then maintained within the temperature range of 160° to 185° F. and is then conveyed to the can filling equipment at which point the cans are filled and sealed with the mixture.

The cans were then placed in bins or baskets which were lowered into vertical retorts operating at a temperature of about 245° to 250° F. The cans were then heated at this temperature for about 65 minutes. The cans were then cooled, rinsed and allowed to dry.

The resulting product on inspection was a homogenous mixture with a uniform appearance and a fish aroma, resembling closely a can of ground fish meat. The contents of the can retained generally the shape of the can when it was poured from the can, although the contents could be readily pulled apart with a fork. The product had the following analysis:

| | |
|---|---|
| Moisture | 70.6% |
| Protein | 19.2% |
| Fat | 8.17% |

EXAMPLE 6

A cat food of a chicken flavor was prepared by grinding the raw meat used in a meat grinder equipped with a ⅜ inch grinding plate. The meats employed included the following indicated as a percentage by weight in the final product, thereby yielding a level of meat in the final product of 38 percent.

| Ingredient | Percentage by Weight |
|---|---|
| Turkey | 8.00% |
| Chicken | 30.00% |

At this time, a dry mixture was formulated which comprised:

| Ingredient | Percentage by Weight |
|---|---|
| Expanded chicken/soybean fibers | 9.00% |
| Minerals | 0.25% |
| Onion Powder | 0.02% |
| Vitamin Premix | 0.57% |
| Wheat Midds | 1.00% |
| Sodium Nitrite | 0.002% |

The expanded chicken/soybean fibers comprised 30 percent chicken and 70 percent of a vegetable protein source and were produced pursuant to U.S. application Ser. No. 193,709 filed Oct. 29, 1971. 50.1 percent by weight of the final product of water was added to all of the above dry ingredients with the exception of the fibers and agitated. The fibers were thereafter added, and the mixture heated to a temperature of 165° to 175°F with agitation. The fibers were then maintained at this temperature for 5 minutes to soak up the moisture.

A mixture of 1 percent corn oil, 0.10 percent phosphoric acid and the prepared ground meat mixture was added to the hot fibers and cooked at a temperature of 165° – 175°F. The mixture is maintained at this temperature and conveyed to can filling equipment at which point the cans containing the mixture are filled and sealed.

The cans were placed in bins or baskets which were lowered into vertical retorts operating at a temperature of approximately 245° to 250°F. The cans were then heated at this temperature for about 65 minutes. The cans were then cooled, rinsed, and allowed to dry.

The resulting product when removed from the can remained as a substantially unsegregated mass that could be pulled apart with a fork into distinct chunks of meat and expanded soybean fibers. The product resembled closely a can of chicken meat.

Reference should be made to the accompanying claims for an understanding of the scope of our invention, and it is our intention to cover thereby all equivalents or modifications of the present invention as may fall within the scope of the appended claims.

We claim:

1. The method of preparing an economical chunk-type complete maintenance canned food composition which incorporates expanded soybean fiber chunks to simulate natural meat chunks in flavor and mastication properties comprising the steps of:

Grinding raw animal meat containing proteinaceous materials to particles of a substantially uniform size;

precooking the ground meat at temperatures of about 160° to 175°F.;

mixing expanded soybean fiber chunks having an expanded fibrous lattice with moisture, oils and flavors therewith;

cooking said chunks with said particles of meat, flavors, moisture and oils at a temperature of 160° to 185°F. for a time which is at least sufficient to coagulate the natural meat protein particles to impregnate the expanded fibrous lattice of the soybean fiber chunks with flavor components of said particles of meat, flavors, and oils to impart the natural meat texture and flavor thereto, said moisture content being at least sufficient to allow absorption of said flavors and oils and cause said particles of meat to adhere to the surface of said chunks;

mixing said impregnated chunks with nutritional materials to form a nutritionally balanced food composition, packing said food composition into a can;

heating said can to about 245° – 250°F. and about 15 p.s.i. for about 65 minutes to cook and sterilize said food composition.

2. Method according to claim 1 wherein the expanded soybean fiber chunks may be added in an amount up to about 25 percent by weight of the food composition.

3. Method according to claim 1 wherein between about 50 – 94 percent by weight of the food composition's moisture is added for cooking of said expanded soybean fiber chunks to allow absorption of said flavors and oils and to cause said particles of meat to adhere to the surface of said chunks.

4. Method according to claim 1 wherein cooking of said chunks is carried out at a temperature between about 160° to 175°F. prior to mixing said nutritious materials therewith.

5. Method according to claim 1 wherein heating is carried out under pressure to sterilize said food composition, said food composition being retained in a substantially uniform condition without separation of components of said food composition.

6. The method of preparing an economical, chunk type, complete maintenance, canned food composition which incorporates expanded soybean fiber chunks having an expanded fibrous meatlike lattice to simulate natural meat chunks in flavor and mastication properties, comprising the steps of:

grinding raw animal meat containing proteinaceous material to particles of a substantially uniform size;

precooking the ground meat at temperature of about 160° to 175°F.;

mixing with said meat particles expanded soybean fiber chunks at about 8 – 10 percent by weight of the food composition to impregnate the expanded meat-like lattice of the chunks, adding moisture in an amount of between about 50 – 94 percent by weight of the food composition's moisture content, oils, and flavors;

cooking said fiber chunks with said particles of meat, flavors, moisture, and oils with steam at a temperature between about 160° to 185°F. for a time which is at least sufficient to coagulate the natural meat protein particles to impregnate said chunks with flavor components of said particles of meat, flavors, and oils and impart a natural meat texture and flavor thereto, said moisture content being at least sufficient to allow absorption of said flavors and oils and cause said particles of meat to adhere to the surface of said chunks;

mixing said impregnated chunks with nutritional materials to form a nutritionally balanced food composition, packing said food composition into a can; and heating said can at a temperature of about 250°F. for about 65 minutes to cook and sterilize said food composition.

7. The method of preparing an economical chunk-type complete maintenance canned animal food composition which incorporates expanded soybean fiber chunks to simulate natural meat chunks in flavor and mastication properties comprising the steps of:

heating a mixture which comprises expanded soybean fiber chunks having an expanded fibrous lattice, moisture, nutritious materials, and flavors to a temperature of between about 160° to 175°F.;

adding ground raw animal meat particles of a substantially uniform size to said mixture;

cooking said chunks with said particles of meat, flavors and moisture at a temperature of 160° to 185°F. for a time which is at least sufficient to impregnate the expanded fibrous lattice of the fiber chunks with flavor components of said particles of meat to impart a natural meat texture and flavor thereto; said moisture content being at least sufficient to allow absorption of said flavors and cause said particles of meat to adhere to the surface of said chunks;

packing said food composition in a can and heating said can to about 245° – 250°F. and about 15 p.s.i. for about 65 minutes to cook and sterilize said food composition.

8. Method according to claim 7 wherein the expanded fiber chunks may be added in an amount up to about 25 percent by weight of the food composition.

9. Method according to claim 8 wherein the expanded fiber chunks may be added in an amount of between about 8 to 10 percent by weight of the food composition.

10. Method according to claim 7 wherein cooking of said chunks is carried out at a temperature between about 160° to 175°F. prior to packing said composition into a can.

* * * * *

UNITED STATES PATENT OFFICE
CERTIFICATE OF CORRECTION

PATENT NO. : 3,865,966
DATED : February 11, 1975
INVENTOR(S) : Thomas B. Coppage et al It is certified that error appears in the above-identified patent and that said Letters Patent are hereby corrected as shown below:

In the Abstract, line 5, "metal" should read --meat--

Column 1, line 28, "chuncks" should read --chunks--

Column 2, line 56, after "of" and prior to "expanded" insert --an--

Column 8, line 7, "fibes" should read --fibers--

Column 12, line 64, "Sodium Nitrate" should read --Sodium Nitrite--

Column 14, line 17, "not" should read --no--

Signed and sealed this 20th day of May 1975.

(SEAL)
Attest:

RUTH C. MASON
Attesting Officer

C. MARSHALL DANN
Commissioner of Patents
and Trademarks